Sept. 27, 1960     S. RUBEN     2,954,418
LEAD PEROXIDE DRY CELL
Filed April 22, 1958
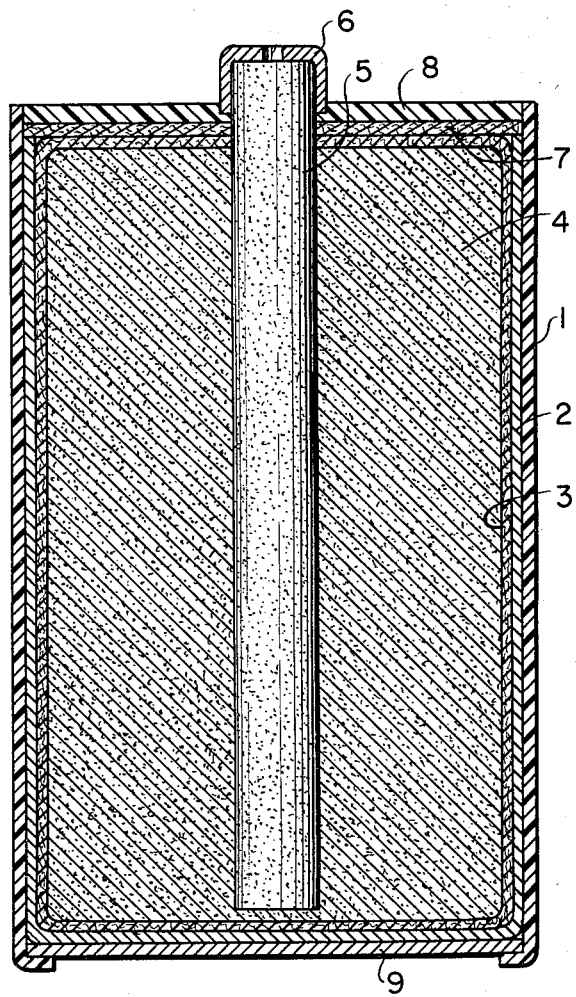
INVENTOR.
Samuel Ruben
BY
ATTORNEY : 2,954,418
Patented Sept. 27, 1960

2,954,418
LEAD PEROXIDE DRY CELL

Samuel Ruben, 52 Seacord Road, New Rochelle, N.Y.

Filed Apr. 22, 1958, Ser. No. 730,219

8 Claims. (Cl. 136—100)

This invention relates to electric current producing devices and more particularly to a lead peroxide primary cell.

An object of the invention is the provision of an efficient dry cell utilizing inexpensive readily available domestic materials and having greater capacity than the conventional manganese oxide-zinc-carbon dry cells.

Another object is the provision of a novel dry cell utilizing a lead anode and a lead peroxide depolarizer.

Further objects will be apparent from the disclosure and from the drawing which is a view partly in section of one embodiment of the invention.

This application is a continuation in part of my co-pending application S. N. 725,184, filed March 31, 1958.

My invention comprises a dry cell in which, in addition to anode, depolarizer and liquid electrolyte, the depolarizer has admixed with it a quantity of the electrolyte component in undissolved solid state form.

The cell system utilized is lead-sulfamic acid-lead-peroxide ($Pb/NH_2SO_3H/PbO_2$). As the solubility of sulfamic acid in water is only about 20% at normal room temperature, it is not feasible to obtain full use of the lead peroxide depolarizer if an aqueous solution is used, the cell soon polarizing on load. I have found, by adding sulfamic acid in powder form to the depolarizer mix, preferably a substantial amount such as in the order of 40% by weight of the depolarizer, that the requisite quantity of sulfamic acid ion is provided to maintain usage of the depolarizer during the course of discharge. As initially assembled, the dry component of sulfamic acid mixed with the lead peroxide is relatively insoluble in the saturated sulfamic acid electrolyte but as the cell is discharged, the dry sulfamic acid particles gradually dissolve in the aqueous medium to provide the necessary $H_2NSO_3$-ion for combination with the lead peroxide.

In order to further describe the invention, reference is made to the drawing which illustrates a cylindrical cell having an outer plastic sleeve (1), the bottom of which is spun over or crimped against tinned steel disc 9 which serves as the negative terminal. Lead can 2 located within the plastic sleeve constitutes the anode and is in contact with the tinned steel disc. A spacer cup 3 formed from laminated cellophane and Dexter paper is placed within the lead can, the paper side contacting the lead. A bobbin 4 is made as follows: 6 parts of lead peroxide powder, 4 parts of dry sulfamic acid and 1 part of Shawinigan black carbon are milled together for 10 minutes. To this mix is added 2 ml. of a 20% aqueous sulfamic acid solution per 9 grams of mix. The Shawinigan black, which acts as an absorbent, is required in the mix to provide adequate retention of the liquid sulfamic acid electrolyte. After thorough mixing, a bobbin of suitable size is formed by extrusion or otherwise and carbon rod 5 inserted. Tinned brass cap 6 is fitted over the end of the carbon rod and serves as the positive terminal. The bobbin is placed in the spacer cup and sufficient compression is applied to it to cause an expansion against and intimate contact with the spacer. The top end of the spacer is folded over and a thick waxed fibre disc 7 is compressed against the folded end and force fitted into the cell so as to maintain bobbin compression. A sealing layer of hard wax 8 is poured on top of the fibre disc to seal the cell against evaporation of the electrolyte. As there is negligible gas, if any, generated in the operation of the cell, the seal can be made tight. The potential of the described system is 1.6 volts and the cell will sustain relatively high current densities.

The percent of undissolved or dry sulfamic acid component may be varied over the widest limits. It may be embodied in the cell by means other than described above. The requirement is that there should be available an excess of sulfamic acid over that dissolvable in the aqueous medium. For practical purposes, an amount of solid sulfamic acid component equal to 20% to 60% by weight of the lead peroxide, is preferred. Generally, there should be an adequate amount to permit efficient utilization of the anode or depolarizer.

The ratio of carbon to lead peroxide depends upon the characteristics desired in the cell and may vary between 4:1 to 8:1 of lead peroxide to carbon. Generally, I prefer to use a higher ratio of carbon in flat type and small cylindrical type cells than in the large size cylindrical cells.

While lead is preferred as the anode material, alloys of lead such as lead-tin or lead-antimony may be used. If a higher voltage is desired, tin may be substituted for the lead, in which case the voltage of the cell is raised to 1.75 volts.

While the drawing illustrates a cylindrical cell, the invention may be embodied in a variety of structures. When made in a flat form the terminal contacting the lead peroxide may be a graphitized or carbon loaded conductive plastic or a graphitized titanium plate. A structure similar to that shown in my said co-pending application S.N. 725,184 employing a lead lined aluminum can and structures similar to those illustrated in my Patent No. 2,422,045 may also be used.

I claim:

1. A primary dry cell comprising an anode selected from the group consisting of lead and tin, a cathode-depolarizer comprising lead peroxide, and an electrolyte of an aqueous sulfamic acid solution, said cathode-depolarizer having admixed therewith a quantity of sulfamic acid in liquid form and sulfamic acid in solid form in an amount sufficient to maintain the electrolyte substantially saturated with sulfamic acid during the operative life of the cell.

2. A primary dry cell comprising an anode of lead, a depolarizer of lead peroxide having admixed therewith a quantity of undissolved solid-state sulfamic acid component, and an electrolyte of an aqueous solution of sulfamic acid, said solid-state sulfamic acid component being present in an amount sufficient to maintain the electrolyte substantially saturated with sulfamic acid during the operative life of the cell.

3. A primary dry cell having an anode comprising lead, a cathode-depolarizer comprising lead peroxide intermixed with electrolyte absorptive carbon and with solid sulfamic acid, and an electrolyte of an aqueous solution of sulfamic acid said solid sulfamic acid constituting an excess over that dissolvable in the electrolyte.

4. A primary dry cell having an anode comprising lead, a depolarizer comprising lead peroxide, a substantially saturated sulfamic acid electrolyte, and an excess of sulfamic acid in undissolved form in an amount sufficient to maintain the electrolyte substantially saturated with sulfamic acid during the operative life of the cell.

5. A primary dry cell having an anode comprising lead, a cathode-depolarizer comprising lead peroxide and carbon, a quantity of undissolved solid sulfamic acid component intermixed with said lead peroxide and carbon and a liquid electrolyte of an aqueous solution of sulfamic acid, said solid sulfamic acid constituting an excess over that dissolvable in the electrolyte.

6. A primary dry cell having an anode comprising lead, a cathode-depolarizer comprising lead peroxide and carbon black having solid undissolved sulfamic acid component admixed therewith, and a liquid electrolyte of an aqueous solution of sulfamic acid, said solid sulfamic acid consituting an excess over that dissolvable in said aqueous electrolyte.

7. A primary dry cell having a lead alloy anode, a porous spacer in contact with said anode, and a cathode depolarizer-electrolyte member comprising a mixture of lead peroxide, carbon, aqueous sulfamic acid solution and undissolved solid sulfamic acid compressed against said spacer, said solid sulfamic acid constituting an excess over that dissolvable in said aqueous solution.

8. A primary dry cell having an anode comprising tin, a depolarizer comprising lead peroxide, and solid sulfamic acid, and an electrolyte comprising an aqueous solution of sulfamic acid, said solid sulfamic acid constituting an excess over that dissolvable in said aqueous solution.

References Cited in the file of this patent

UNITED STATES PATENTS

| | | |
|---|---|---|
| 2,619,437 | Glasstone | Nov. 25, 1952 |
| 2,810,006 | Ruben | Oct. 15, 1957 |